(12) United States Patent
Corcoran et al.

(10) Patent No.: US 8,510,203 B2
(45) Date of Patent: Aug. 13, 2013

(54) METHODS AND SYSTEMS FOR PROVIDING PREFERRED STOCK CREDIT DEFAULT SWAPS

(75) Inventors: Thomas Corcoran, Bay Shore, NY (US); Ashish Shah, New York, NY (US); Megan Philbin, New York, NY (US); Vincent Basulto, Port Washington, NY (US); Jock Jones, New York, NY (US); Anthony S. Bugliari, Summit, NJ (US); Daniel Crowley, New York, NY (US); Andrew Layng, New York, NY (US); Daron Pope, New York, NY (US); Jason Quinn, New York, NY (US)

(73) Assignee: Barclays Capital, Inc., New York, NY (US)

( * ) Notice: Subject to any disclaimer, the term of this patent is extended or adjusted under 35 U.S.C. 154(b) by 269 days.

(21) Appl. No.: 11/519,577

(22) Filed: Sep. 11, 2006

(65) Prior Publication Data

US 2007/0083447 A1   Apr. 12, 2007

Related U.S. Application Data

(60) Provisional application No. 60/715,732, filed on Sep. 9, 2005, provisional application No. 60/719,057, filed on Sep. 20, 2005.

(51) Int. Cl.
*G06Q 40/00* (2012.01)

(52) U.S. Cl.
USPC ............................................. 705/37

(58) Field of Classification Search
CPC ............... G06Q 40/04; G06Q 40/06
USPC ............................................. 705/37
See application file for complete search history.

(56) References Cited

U.S. PATENT DOCUMENTS

| | | | |
|---|---|---|---|
| 7,212,993 B1 * | 5/2007 | Bodurtha et al. | 705/35 |
| 2004/0236660 A1 * | 11/2004 | Thomas et al. | 705/37 |
| 2005/0149428 A1 * | 7/2005 | Gooch et al. | 705/37 |

OTHER PUBLICATIONS

Mullaney, Timothy J., "BTR Realty to defer dividend payments", The Sun, Baltimore, Md.: May 14, 1991. p. 12.B.*
Investopedia.com, "Credit Default Swap", Mar. 16, 2005, accessed via Internet Archives <www.archive.org>.*
Wikipedia.org, "Credit event", Sep. 28, 2005 archive.*
"Fixed Income", Wikipedia Archive, Jun. 2004.*
French; *Lehman's New Twist in Credit Derivatives*; Investment Dealers' Digest; Jul. 25, 2005, pp. 1,2.
J.P. Morgan; *Introducing Credit Default Swaps on Preferred Stock*, Corporate Quantitative Research; Jul. 19, 2005, pp. 1-12.
DNA Training & Consulting; *Newsletter* Issue No. 26, Jan.-Mar. 2005; pp. 1-12.

* cited by examiner

*Primary Examiner* — Eric T Wong
(74) *Attorney, Agent, or Firm* — Morgan Lewis & Bockius LLP

(57) ABSTRACT

In one aspect, the invention comprises a method comprising the steps of: (a) specifying a reference entity which is an obligor with respect to preferred securities; (b) defining a credit event to include deferral of dividend or coupon on the preferred securities; (c) specifying a payoff to include the preferred securities, the payoff to be made following the credit event; (d) specifying a premium; (e) executing an agreement with a protection buyer, wherein the agreement comprises terms based on the reference entity, the credit event, and the payoff, and wherein the protection buyer agrees to pay the premium in return for a promise to provide the payoff to the protection buyer upon occurrence of the credit event; and (f) receiving the premium from the protection buyer.

20 Claims, 6 Drawing Sheets

Contingent Payment upon Credit Event
(Suspension of Dividend) of
Reference Entity Between trade initiation and default or maturity, protection buyer makes regular payments of default swap spread to protection seller Default swap spread Following the credit event one of the following will take place:

Cash Settlement

100-Recovery Rate

Physical Settlement

PRIOR ART

METHODS AND SYSTEMS FOR PROVIDING PREFERRED STOCK CREDIT DEFAULT SWAPS

CROSS REFERENCE TO RELATED APPLICATIONS

This application claims the benefit of U.S. Provisional Application No. 60/715,732, filed Sep. 9, 2005, and U.S. Provisional Application No. 60/719,057, filed Sep. 20, 2005. The entire contents of those two provisional applications are incorporated herein by reference.

BACKGROUND

In the early 1990s, banks developed credit derivatives contracts by purchasing protection from insurers in order to manage the banks' exposure to corporate loans on the banks' books. Moreover, the 1988 Basel I Accord and associated rules required banks to set aside a greater percentage of their capital against outstanding loans. Banks preferred to transfer loan risk to entities that weren't subject to the same capital reserve requirements, and used credit derivatives to transfer risk while retaining the ownership and profits of their loans.

The credit derivatives market has experienced considerable growth since then. This growth has been driven by an increasing realization of the advantages credit derivatives possess over the cash alternative, plus the many new possibilities they present. The primary purpose of credit derivatives is to enable the efficient transfer and repackaging of credit risk. The typical definition of credit risk encompasses all credit-related events ranging from a spread widening, through a ratings downgrade, all the way to default. Banks in particular are using credit derivatives to hedge credit risk, reduce risk concentrations on their balance sheets, and free up regulatory capital in the process.

In their simplest form, credit derivatives provide a more efficient way to replicate in a derivative form the credit risks that would otherwise exist in a standard cash instrument. For example, a standard credit default swap can be replicated using a cash bond and the repo market. In their more exotic form, credit derivatives enable the credit profile of a particular asset or group of assets to be split up and redistributed into a more concentrated or diluted form that appeals to the various risk appetites of investors.

The default swap has become the standard credit derivative. For many, it is the basic building block of the credit derivatives market. According to the British Bankers' Association Credit Derivatives Survey, it dominates the credit derivatives market with a significant portion of the outstanding notional. Its appeal is its simplicity and the fact that it presents to hedgers and investors a wide range of possibilities that did not previously exist in the cash market.

A default swap is a bilateral contract that enables an investor to buy protection against the risk of default of an asset issued by a specified reference entity. Following a defined credit event, the buyer of protection receives a payment intended to compensate against the loss on the investment. This is shown in FIG. 1. In return, the protection buyer pays a fee. For short-dated transactions, this fee may be paid up front. More often, the fee is paid over the life of the transaction in the form of a regular accruing cash flow. The contract is typically specified using the confirmation document and legal definitions produced by the International Swaps and Derivatives Association (ISDA). Despite the rapid moves toward the idea of a standard default swap contract, a default swap is still very much a negotiated contract. There are, therefore, several important features that need to be agreed upon between the counterparties and clearly defined in the contract documentation before a trade can be executed.

The first thing to define is the reference entity. This is typically a corporate entity ("corporate"), bank, or sovereign issuer. There can be significant differences between the legal documentation for corporate, bank, and sovereign linked default swaps.

The next step is the definition of the credit event itself. This is obviously closely linked to the choice of the reference entity and may include the following events: (1) bankruptcy (not relevant for sovereigns); (2) failure to pay; (3) obligation acceleration/default; (4) repudiation/moratorium; and/or (5) restructuring. These events are defined in the ISDA 2003 Credit Derivatives Definitions.

Some default swaps define the triggering of a credit event using a reference obligation. The main purpose of the reference obligation is to specify exactly the capital structure seniority of the debt that is covered. The reference obligation is also important in the determination of the recovery value should the default swap be cash settled (see FIG. 1). However, in many cases the credit event is defined with respect to a seniority of debt issued by a reference entity, and the only role of the reference obligation is in the determination of the cash settled payment. The maturity of the default swap need not be the same as the maturity of the reference obligation. It is common to specify a reference obligation with a longer maturity than the default swap.

The contract specifies the payoff that is made following the credit event. Typically, this will compensate the protection buyer for the difference between par and the recovery value of the reference obligation following the credit event. This payoff may be made in a physical or cash settled form. The protection buyer will usually agree to do one of the following:

(A) Physically deliver a defaulted security to the protection seller in return for par in cash. Note that the contract usually specifies a basket of obligations that are ranked pari passu that may be delivered in place of the reference obligation. In theory, all pari passu assets should have the same value on liquidation, as they have an equal claim on the assets of the firm. In practice, this is not always reflected in the price of the asset following default. As a result, the protection buyer who has chosen physical delivery is effectively long a "cheapest to deliver" option.

(B) Receive par minus the default price of the reference obligation settled in cash. The price of the defaulted asset is typically determined via a dealer poll conducted within 14-60 days of the credit event, the purpose of the delay being to let the recovery value stabilize. In certain cases, the asset may not be possible to price, in which case there may be provisions in the documentation to allow the price of another asset of the same credit quality and similar maturity to be substituted.

(C) Fixed cash settlement. This applies to fixed recovery default swaps, which are described below.

The first two choices are shown in FIG. 1. If the protection seller has the view that either by waiting or by entering into the work-out process with the issuer of the reference obligation he may be able to receive more than the default price, he will prefer to specify physical delivery of the asset.

Unless already holding the deliverable asset, the protection buyer may prefer cash settlement in order to avoid any potential squeeze that could occur on default. Cash settlement will also be the choice of a protection buyer who is simply using a default swap to create a synthetic short position in a credit. This choice has to be made at trade initiation.

The protection buyer stops paying the premium once the credit event has occurred, and this feature has to be factored into the cost of the default swap premium payments. It has the benefit of enabling both parties to close out their positions soon after the credit event and so eliminates the ongoing administrative costs that would otherwise occur. Current market standards for banks and corporates require that the protection buyer pay the accrued premium up to the credit event; sovereign default swaps do not require a payment of accrued premium.

The details of an exemplary default swap trade are shown in Table 1. The example is a £50 million, 3-year default swap linked to Poland. The cost of the protection is 33 bp per annum paid quarterly. The cash flows are shown in FIG. 2. The size of each cash flow is given by £50 million×0.0033× 0.25=£41,250. The figure shows both the scenario in which no default occurs and the scenario in which default does occur. If default occurs and the recovery rate on the defaulted asset is 50% of the face value, then the protection buyer receives £25 million.

TABLE 1

Details of an Example Default Swap Trade
Default Swap Details

| | |
|---|---|
| Currency | Euro |
| Maturity | 3 Years |
| Reference Entity | Poland |
| Notional | $50m |
| Default Swap Spread | 33 bp |
| Frequency | Quarterly |
| Payoff upon Default | Physical delivery of asset for par |
| Credit Event | see section 6.1 for a list of credit events |

A default swap is a par product: it does not totally hedge the loss on an asset that is currently trading away from par. If the asset is trading at a discount, a default swap over-hedges the credit risk and vice-versa. This becomes especially important if the asset falls in price significantly without a credit event. To hedge this, the investor can purchase protection in a smaller face value or can use an amortizing default swap in which the size of the hedge amortizes to the face value of the bond as maturity is approached.

Preferred stock is well-known—generally, it is stock that pays cash dividends on a regular basis (typically quarterly), that is senior to common stock (but junior to company debt), and has no voting rights. In the past, offshore investors were strongly discouraged from investing in cash preferreds due to negative tax implications (withholding tax on all dividends). Also, historically there has been limited liquidity in the preferred market. Other drawbacks include:

(a) Limited ways of being short—no way in derivative form to get short a credit in the preferred level of the capital structure;

(b) Limited ways of hedging preferred "credit risk"—while taking the structure risk;

(c) A more limited delivery universe and fewer credit events—no derivative reference product which allowed:
(i) delivery of a preferred security on a credit event; or
(ii) dividend deferral/non-payment on a preferred/trust preferred as a credit event;

(d) No preferred dividend deferral feature in standard CDS contracts.

Thus, there is a need for:
a derivative instrument that can be used to hedge preferred investments;
a derivative instrument that can replicate a preferred in subordination and deferral trigger;
a derivative instrument that generically references the preferred part of the capital structure and can serve as a pricing benchmark; and
a product that educates investors by increasing the focus on the hybrid capital market.

SUMMARY

Preferred CDS ("PCDS") (used herein generically to refer to preferred embodiments of the invention) is a novel type of credit default swap. PCDS shares many traits with traditional CDS. There are at least two major differences: (A) PCDS includes the deferral of a trust preferred coupon or preferred stock dividend as a credit event; and (B) the deliverable obligations in the case of a credit event are expanded to include preferred stock along with bonds and loans.

Although credit derivatives referenced to subordinated bank debt are widely traded, preferred securities mark a new frontier for the default swap market. Such securities rank below subordinated debt but above common stock. They are issued either as perpetuals, or in the case of trust preferreds, have very long dated final maturities. Coupons or dividend payments can be deferred. Such payment deferrals count as a credit event in a PCDS, in addition to bankruptcy, failure to pay and restructuring.

Most types of preferred and trust preferred securities can be delivered into the contract, but mandatory convertibles—convertibles which must convert into the common stock—are not deliverable (in one embodiment). Securities that rank higher than preferred also are eligible.

In at least one embodiment, PCDS provides a preferred deliverable on a credit event and a dividend deferral on a preferred or trust preferred trigger. Users are able to: (a) hedge traditional cash preferred securities; (b) create synthetic single name risk in the preferred level; (c) create multi-name portfolios of preferred risk; (d) create structured products using PCDS as a building block (first to default baskets (FTDs), tranches of portfolios, and/or credit linked notes (CLNs)).

In one aspect, the invention comprises a method comprising the steps of: (a) specifying a reference entity which is an obligor with respect to preferred securities; (b) defining a credit event to include deferral of dividend or coupon on the preferred securities; (c) specifying a payoff to include the preferred securities, the payoff to be made following the credit event; (d) specifying a premium; (e) executing an agreement with a protection buyer, wherein the agreement comprises terms based on the reference entity, the credit event, and the payoff, and wherein the protection buyer agrees to pay the premium in return for a promise to provide the payoff to the protection buyer upon occurrence of the credit event; and (f) receiving the premium from the protection buyer.

In various embodiments: (1) the method further comprises providing the payoff to the protection buyer upon occurrence of a deferral of a dividend or a coupon; (2) the preferred securities are perpetual preferred or hybrid securities; and (3) the preferred securities are trust preferred securities.

In another aspect, the invention comprises a method comprising the steps of: (a) executing an agreement with a protection provider, wherein the agreement comprises definitions for a reference entity, a credit event, and a payoff, and wherein the protection provider promises to provide the payoff upon occurrence of the credit event in exchange for payment of a premium; and (b) paying the premium to the protection provider; wherein the reference entity is an obligor with respect to preferred securities, wherein the credit event is defined to include deferral of dividend or coupon on the preferred securities, and wherein the payoff to be made following the credit event includes the preferred securities.

In various embodiments: (1) the method further comprises receiving the payoff from the protection provider upon occurrence of a deferral of a dividend or coupon; (2) the preferred securities are perpetual preferred or hybrid securities; and (3) the preferred securities are trust preferred securities.

In another aspect, the invention comprises a method comprising the steps of: (a) executing an agreement with a protection buyer, wherein the agreement comprises definitions for a reference entity, a credit event, and a payoff, and wherein the protection buyer agrees to pay a premium in exchange for a promise to provide the payoff upon occurrence of the credit event; and (b) receiving the premium from the protection buyer; wherein the reference entity is an obligor with respect to preferred securities, wherein the credit event is defined to include deferral of dividend or coupon on the preferred securities, and wherein the payoff to be made following the credit event includes the preferred securities.

In various embodiments: (1) the method further comprises providing the payoff to the protection buyer upon occurrence of a deferral of a dividend or a coupon; (2) the preferred securities are perpetual preferred or hybrid securities; and (3) the preferred securities are trust preferred securities.

In another aspect, the invention comprises a method comprising the steps of: (a) agreeing upon a reference entity which is an obligor with respect to preferred securities; (b) agreeing upon a definition of a credit event to include deferral of dividend or coupon on the preferred securities; (c) agreeing that a payoff is to include the preferred securities, the payoff to be made following the credit event; (d) agreeing upon a premium; (d) executing an agreement with a protection provider, wherein the agreement comprises terms based on the reference entity, the credit event, and the payoff, and wherein the protection provider promises to provide the payoff upon occurrence of the credit event in exchange for payment of the premium; and (e) paying the premium to the protection provider.

In various embodiments: (1) the method further comprises receiving the payoff from the protection buyer upon occurrence of a deferral of a dividend or a coupon; (2) the preferred securities are perpetual preferred or hybrid securities; and (3) the preferred securities are trust preferred securities.

In another aspect, the invention comprises a credit default swap comprising an agreement between a protection buyer and a protection provider, wherein the agreement comprises definitions for a reference entity, a credit event, and a payoff, and wherein the protection buyer agrees to pay a premium to the protection provider in exchange for a promise from the protection provider to provide the payoff to the protection buyer upon occurrence of the credit event; wherein the reference entity is an obligor with respect to preferred securities, wherein the credit event is defined to include deferral of dividend or coupon on the preferred securities, and wherein the payoff to be made following the credit event includes the preferred securities.

In various embodiments: (1) the preferred securities are perpetual preferred or hybrid securities; and (2) the preferred securities are trust preferred securities.

The above-described aspects and embodiments are not intended to be limiting. Those skilled in the art will perceive other aspects and embodiments after reviewing the drawings and the detailed description herein.

DETAILED DESCRIPTION

As mentioned above, PCDS shares many traits with traditional CDS. But there are at least two major differences:

(A) PCDS includes the deferral of a trust preferred coupon or preferred stock dividend as a credit event. With a few exceptions, a company can defer or suspend payments on preferred level securities while continuing to pay interest on more senior debt. Accordingly, the deferral feature is included as an additional credit event in addition to, for example, bankruptcy, failure to pay, or restructuring (the three standard CDS credit events).

(B) The deliverable obligations in the case of a credit event are expanded to include preferred stock along with bonds and loans. PCDS references preferred-level securities as an additional deliverable: While the majority of default swaps reference companies' senior unsecured debt, the reference obligation for PCDS is either preferred or trust preferred stock. If a credit event (including deferral) occurs, the buyer of protection can deliver either a preferred/trust preferred security or any obligation (e.g., bonds and loans) more senior in the capital structure. Optionally, convertible securities are deliverable upon cessation of dividend, while mandatory convertibles are not.

Certain changes have been made to the traditional CDS contract to ensure that preferred securities are deliverable. Since most preferred securities are either perpetual or have extended maturities, the 30-year maximum maturity limitation does not apply to PCDS. However, following a restructuring trigger, preferred securities would be subject to the restructuring maturity limitation date, as PCDS trades with modified restructuring. An exemplary PCDS contract is shown below in the Appendix.

TABLE 2

Comparison of PCDS to CDS

| Terms | PCDS | Traditional CDS |
|---|---|---|
| Reference Entity | ✓ | ✓ |
| Reference Obligation | ✓ | ✓ |
| Physical Settlement | ✓ | ✓ |

TABLE 2-continued

Comparison of PCDS to CDS

| | PCDS | Traditional CDS |
|---|---|---|
| Scheduled Termination Date | ✓ | ✓ |
| Quarterly Pay | ✓ | ✓ |
| Credit Events | | |
| Bankruptcy | ✓ | ✓ |
| Failure to Pay | ✓ | ✓ |
| Restructuring | ✓ | ✓* |
| Deferral | ✓ | |
| Deliverable Obligation | | |
| Senior Debt | ✓ | ✓ |
| Subordinated Debt | ✓ | |
| Preferred Securities | ✓ | |
| Reference Obligation | Preferred or Trust Preferred | Senior Unsecured |

*Most investment-grade and emerging markets CDS contracts trade with restructuring as a credit event.

Valuing the Premium of PCDS to CDS

Figure 1:
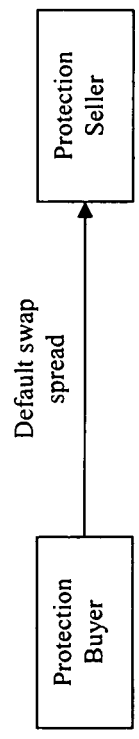
FIG. 1 illustrates typical credit default swaps.
Figure 1:
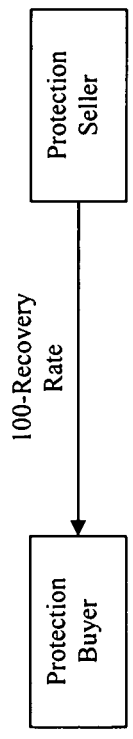
Figure 1:
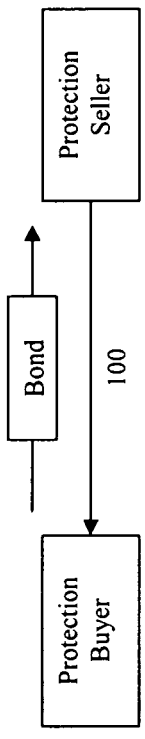
Figure 2:
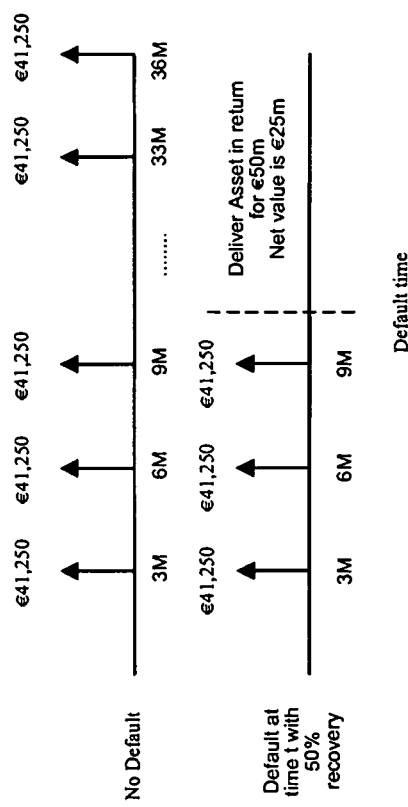
FIG. 2 depicts cash flows of an exemplary credit default swap.
Figure 3:
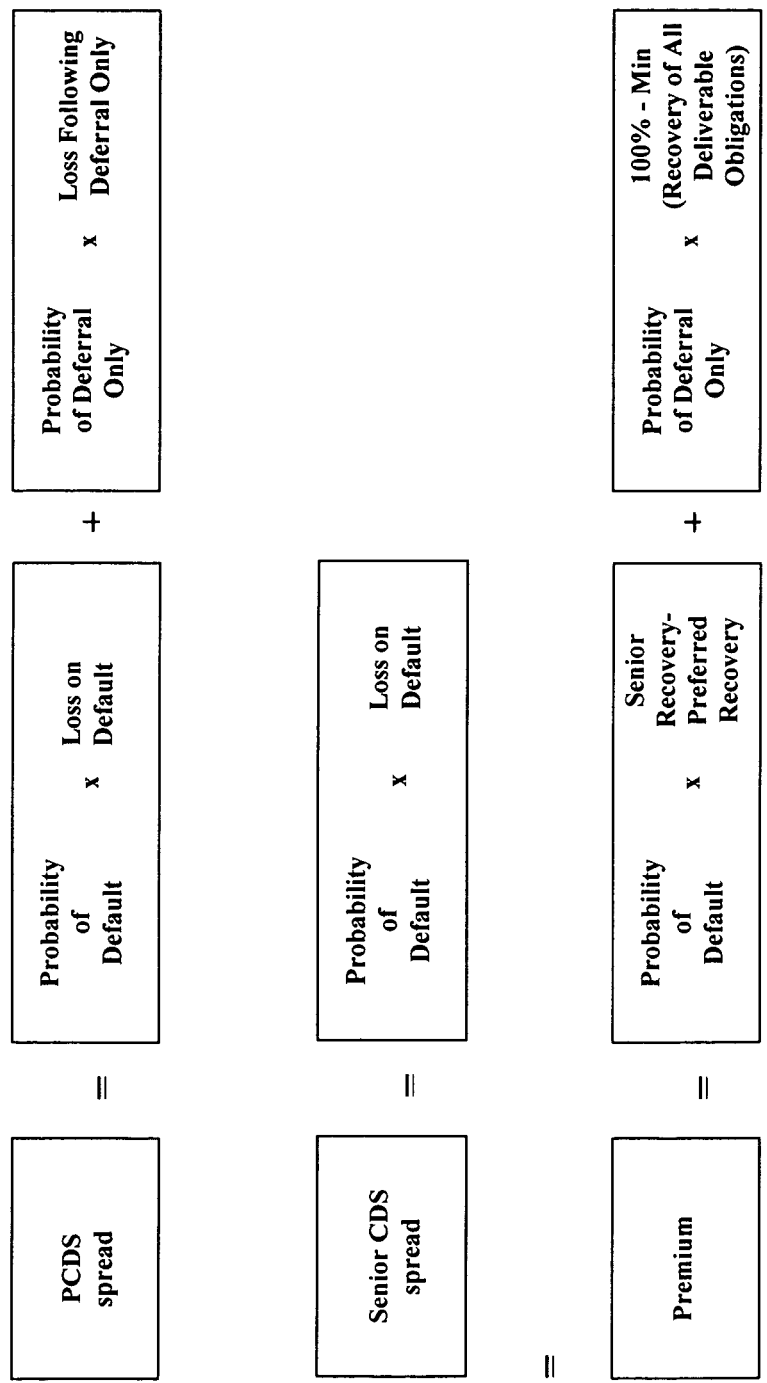
FIG. 3 illustrates preferred PCDS pricing.

In order to develop a valuation framework for PCDS, it is helpful to start with the basic valuation framework for CDS and adjust for the added deliverable and trigger event. For simplicity's sake, the credit events of bankruptcy, failure to pay, and restructuring are referred to jointly as "default." Then, as shown in FIG. 3, the premium is the PCDS spread minus the senior CDS spread.

A typical CDS spread compensates investors for the "expected loss" on the credit, which is simply the cumulative probability of default times the loss on default. For the same issuer, the probability of default will be the same for both senior CDS and PCDS. However, the loss for PCDS will be greater than or equal to that of senior CDS because of its subordination. In addition, it is possible for deferral to occur without default. In that case, only the preferred CDS contract would trigger. This feature, combined with its deeper subordination, will cause PCDS to trade at a premium to senior CDS.

TABLE 3

EOP: PCDS versus Senior CDS

| | Spread | Recovery | |
|---|---|---|---|
| PCDS$^{SM}$ | 118 bp | 10% | |
| Senior CDS | 39 bp | 45% | |
| Premium | 79 bp | 35% | Loss Differential on Default |

As of Aug. 2, 2005.

Implied Default Probability=39 bp/(100%−45%)=0.71%
Subordination Premium=0.71%*(45%−10%)=25 bp
Deferral Premium=79 bp−25 bp=54 bp

TABLE 4

Current Premiums by Sector (bp)

| Sector | PCDS$^{SM}$ | Senior CDS | Difference | Multiple |
|---|---|---|---|---|
| Agency | 57 | 14 | 43 | 4.2× |
| Yankee Banks | 39 | 10 | 29 | 4.0× |
| REITs | 121 | 38 | 83 | 3.2× |
| Banks | 55 | 22 | 33 | 2.5× |
| Brokers | 59 | 27 | 32 | 2.2× |
| Energy | 315 | 146 | 169 | 2.2× |

TABLE 4-continued

Current Premiums by Sector (bp)

| Sector | PCDS$^{SM}$ | Senior CDS | Difference | Multiple |
|---|---|---|---|---|
| Utility | 67 | 33 | 35 | 2.1× |
| Insurance | 53 | 29 | 23 | 1.8× |

As of Aug. 2, 2005.

Fundamental Factors that Drive PCDS Premia

Due to the limited amount of data for preferred deferrals, it is difficult to estimate the value of the factors that influence probability of "deferral without default" and losses in such cases. In addition, the cash markets provide limited spread guidance because of differences in tax treatment and structures across cash preferreds. However, we have attempted to identify the major factors that may influence the premium to senior CDS based on past and recent deferral events. This analysis can be divided into a view about credit events and preferred losses related to credit events.

What Will Drive the Chances of Simultaneous Default and Deferral as Opposed to Deferral Only? Large regulated financial entities are more likely to experience a deferral without default because of regulatory intervention aimed at protecting depositors, policyholders, consumers, or other operating company counterparties from incremental financial harm. These entities are likely to have significant access to liquidity through government facilities such as the Fed window, reducing the probability of a liquidity-driven default while increasing the likelihood of a deferral trigger forced by the regulators.

One recent example of such a deferral was by Riggs Bank. Riggs had agreed to be acquired by PNC, but was facing charges from the Justice Department. During November 2004, the regional Federal Reserve Bank required the bank to defer its dividend on all (trust) preferreds. In this case, because an acquisition was likely, the deferral only caused the preferred to trade to $100. Looking at more senior deliverables, based on the limited pricing available, it does not seem that any other deliverable Riggs bond was trading below par, so a seller of protection most likely would not have sustained a loss on deferral.

For non-financials, the likely path of credit deterioration is very important. For most non-financials, expectations of a gradual credit deterioration will increase the chances of deferral without default over the case of a "jump to default" due to fraud or a major loss that results in strategic bankruptcy.

New mandatory deferral structures may increase the likelihood of deferral without default. These structures have become popular because of the high equity content allocated by the rating agencies (often up to 75%). For issuers that have preferred with mandatory deferral triggers outstanding, the PCDS premium should be higher than for issuers that do not. This premium should be limited, however, since the severe rating consequences of deferring a dividend will encourage companies to use the "cure features" to avoid deferral.

What Drives Preferred Recoveries (in "Default and Deferral" versus "Deferral Only")? If default and deferral are simultaneous, then preferred recoveries will be very sensitive to senior bond recoveries. Unless senior bonds are "covered" and suffer limited loss, preferred recoveries are likely to be close to zero. If senior bonds are covered, preferred recoveries may be higher than zero, particularly in the case of strategic or liquidity driven bankruptcies. In a recent study of defaults from 1982 to 2003, Moody's found that the median recovery rate for senior unsecured bonds was 31 percent, compared with only 9 percent for preferred stock (Recovery Rates on Defaulted Corporate Bonds and Preferred Stocks, 1982-2003, Moody's Investors Service, December 2003). This is not surprising, given the relatively low standing of preferred stock in bankruptcy proceedings relative to senior debt.

If deferral occurs without default, preferred recoveries will be driven by the severity of the credit situation. If the deferral occurs but credit quality is expected to improve quickly (as in the case of the Riggs Bank example above), losses on deferral should be limited. In the case of a deferral that precedes a default by a short period, losses will likely be substantial.

TABLE 5

Effect on the PCDS$^{SM}$ Premium

| | PCDS$^{SM}$ Premium | |
|---|---|---|
| | Higher | Lower |
| Regulated Entity | ✓ | |
| Deteriorating Non-Financial | ✓ | |
| High Jump-to Default Probability | | ✓ |
| Mandatory Deferral | ✓ | |
| High Recovery Differential | ✓ | |
| Low Recovery Differential | | ✓ |

PCDS Valuation Versus Cash

Valuing PCDS versus cash securities is not as straightforward as with traditional CDS, because additional structural factors present in preferred securities drive the basis.

Tax Treatment. Many preferred securities benefit from the DRD (DRD refers to dividends received deductible; qualifying dividends received by U.S. corporations are usually 70 percent tax exempt) and the QDI (QDI refers to qualifying dividend income; qualifying dividends are taxed at a preferential rate for individuals), while PCDS does not. This feature can cause cash to trade tighter than CDS. Having said this, most offshore investors are subject to 30% withholding tax on "true" preferreds, making them more likely to sell PCDS than buy cash.

Extension Risk. While many cash preferreds have features that increase their spreads/coupons after a certain date, encouraging redemptions, most preferreds are perpetual in nature and subject to extension on credit deterioration. As a result, they typically trade wide of PCDS, which is bullet risk in nature.

Negative Rate and Spread Convexity. Most preferreds are callable and, as a result, have negative rate and spread convexity. Therefore, cash should, all other things being equal, trade wider than PCDS.

Caps and Floors. Some preferred securities have caps and/or floors on coupons. This could have a positive or negative effect on the basis depending on the structure.

TABLE 6

PCDS-Cash Comparisons

| Ticker | Coupon | Call Date | Maturity | Step | Cap/ Floor | Tax Treatment | Price | LIBOR Spread | Taxable Equivalent Spread* | PCDS Spread | Basis |
|---|---|---|---|---|---|---|---|---|---|---|---|
| BAC | 5.625 | Bullet | Mar. 8, 2035 | N | N | N/A | $99.2 | 66 | 66 | 43 | −23 |
| FNM | 10 yr CMT + 237 | December 2007 | Perpetual | N | Floor | DRD | $55.5* | 0 | 255* | 68 | 68 |
| MER | L + 75 | November 2009 | Perpetual | N | Floor | DRD | $25.0* | 80 | 291* | 58 | −22 |
| NRU | 5.95 | February 2010 | Feb. 15, 2045 | N | N | N/A | $24.5* | 23* | 23* | 60 | 37 |
| BACR | 6.278 | December 1934 | Perpetual | Y | N | QDI | $101.4 | 115 | 305 | 37 | −78 |

As of Aug. 2, 2005.
*For MER and NRU, par is $25, For FNM, par is $50.
*LIBOR OAS is used for NRU and LIBOR spread-to-call is used for FNM and MER.
*Taxable equivalent assumes a 1.38x gross up for DRD-eligible investors.

PCDS can be Useful to Both Investors and Hedgers

PCDS offers many advantages for investors looking to take preferred-level risk:

Bullet exposure without extension risk. All traditional preferreds are perpetual, and some are callable by the issuer. While trust preferred securities offer final maturities, most are callable, and some have a coupon reset feature in the event that the issue is not called. As a result of the call feature, many preferred securities offer limited upside while leaving uncertainty about the final maturity. By selling PCDS, investors can eliminate these risks.

Subordinate exposure without negative rate or spread convexity. The majority of preferreds issued have fixed-rate callable structures that are negatively convex to rates. PCDS allows investors to couple the preferred-level risk with a bullet fixed- or floating-funded asset to create positive credit and rate convexity.

Tax Neutral for Offshore Investors. While investors located in non-tax-friendly countries face a 30% withholding tax on preferred stock, PCDS is not expected to be subject to this tax (subject to final evaluation by each counterparty's tax counsel).

Preferred CDS also offers advantages to investors looking to hedge or get short preferred level risk.

Efficient and available short. Approximately two-thirds of traditional preferred securities are NYSE listed. Shorting these securities can be difficult as a result of the NYSE "locate to borrow" rule. While some trust preferred securities can be shorted, there is always the potential for a short squeeze. By buying PCDS protection, investors can get short preferred-level risk without this short squeeze risk. In addition, call and reset features can make it tougher to hedge interest rate risk in most preferreds. PCDS eliminates these difficulties and lets investors take a pure credit view.

Efficient hedge that may allow investors to maintain the tax benefits of cash preferreds. For the reasons mentioned above, PCDS also serves as an effective tool for investors looking to hedge preferred risk. In addition, in certain scenarios, investors can continue to receive the DRD or QDI while hedging their positions with Preferred CDS.

PCDS Risks

Like all new derivative products, in addition to credit risk, PCDS brings with it a number of risks that must be considered before trading:

Documentation Risk—As with any new credit derivative product, PCDS documentation has not been tested through a deferral or default event. As a result, there is a risk that the contract may not behave as the counterparties expect. This is partially mitigated by the PCDS documentation's being built on the well-seasoned CDS contract, which has gone through a number of credit events.

Liquidity Risk—As with most new derivative products, PCDS has more limited liquidity than regular CDS markets. However, certain dealers have started making markets in PCDS. Investors can mitigate liquidity concerns by trading shorter-dated maturities in higher-quality credits until the PCDS market becomes more seasoned.

Cheapest to Deliver Risk—As a derivative instrument, PCDS is subject to many of the same risks as CDS when it comes to the choice of instrument a protection buyer wishes to deliver. In the case of a deferral trigger, it is important to note that buyers can deliver "optionally" convertible preferred stock of par value equal to that of the contract. They cannot, however, deliver "mandatory" preferreds. Buyers of PCDS can also deliver any instrument more senior in the capital structure in the case of a default or deferral trigger, just as with CDS.

"Squeeze" Risk—For buyers of PCDS protection, an important risk to consider is that of deliverable "squeeze" risk. Deliverable squeezes occur when buyers of protection scramble for limited deliverable securities following a trigger event. For issuers with limited preferred deliverables outstanding, this is mitigated somewhat by allowing delivery of more senior obligations in the case of deferral, as is the case in CDS.

Structures for Investment

Preferred CDS is a building block for many other types of investment structures. All of these can be tailored to meet an investor's investment needs.

Credit-linked notes provide bullet preferred exposure for investors who cannot use derivatives.

First-to-default baskets provide enhanced yield for investors looking to take leveraged exposure to preferreds.

Synthetic CDOs. It is likely that PCDS will eventually be included in synthetic CDOs. Given current spreads on some names, their inclusion in synthetic CDOs appears to be attractive from a ratings efficiency perspective.

Key PCDS Technicals

As with the CDS market a few years ago, technicals will affect PCDS spread levels and create buy and sell opportunities in the market for investors with fundamental credit views. Key PCDS technicals are likely to be the same ones observed in the CDS market:

Convert Hedging. Many convertible securities are issued at the preferred level. Hedging of these securities will push spreads wider.

New Issuance/Dealer Hedging. Dealer hedging of new issues and secondary risk will also drive spreads wider.

Synthetic CDO issuance. As dealers issue synthetic CDOs and first-to-default baskets with PCDS, they sell protection to hedge their positions. This technical should drive spreads tighter.

In the past, the preferred market has been driven by issuers' needs. The bullet maturity, lack of tax penalty, and the simplified structure of PCDS will make this market more homogeneous and allow many more investors to participate. This growth will create new trading opportunities in the preferred market, similar to those present in the senior market, including basis, curve, and senior-preferred trades. Trading is likely to focus on higher-quality names in which investors are more comfortable stepping down the capital structure and names that are more liquid in the cash preferred market, as dealers and investors may need to hedge risk. Increased issuance of leveraged structures such as first-to-default baskets will likely cause compression and curve steepening as investors dip their toes into shorter maturities.

Figure 4:
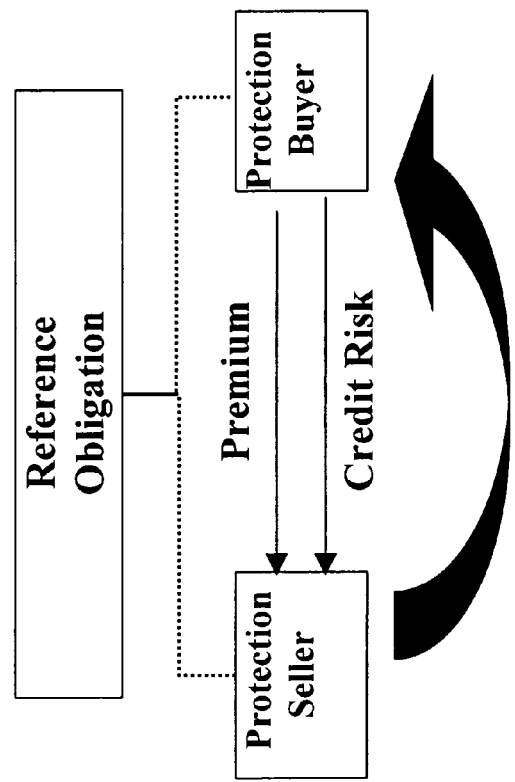
FIG. 4 depicts a preferred PCDS structure.

PCDS is an agreement whereby two parties exchange the credit risk of a Reference Entity without explicitly buying or selling the actual instrument. The Protection Buyer pays a periodic premium (or, less frequently, an upfront payment) to the Protection Seller in exchange for the Protection Seller's commitment to reimburse the Protection Buyer for losses resulting from a Credit Event that affects the risk of a specified Reference Obligation. See FIG. 4.

In addition to standard high grade CDS terms:

(A) The Reference Obligation will be a preferred or trust preferred security (each, a "Preferred Security").

(B) Obligations will include Preferred Securities.

(C) Additional Credit Event (only for Preferred Securities): "Deferral of Payment." Failure to pay stated dividend/distribution in full after expiration of grace period. Preferably this includes any deferral.

(D) Deliverable Obligations will include preferred and trust preferred securities. "Max Maturity" does not apply to PCDS. "Not Contingent" does not apply to PCDS. "Not Subordinated" still determined by reference to Reference Obligation. If the Reference Obligation is a trust preferred, look to the bond held by the trust preferred issuer. "Due and Payable Amount" determined by par amount of Preferred Security.

Figure 5:
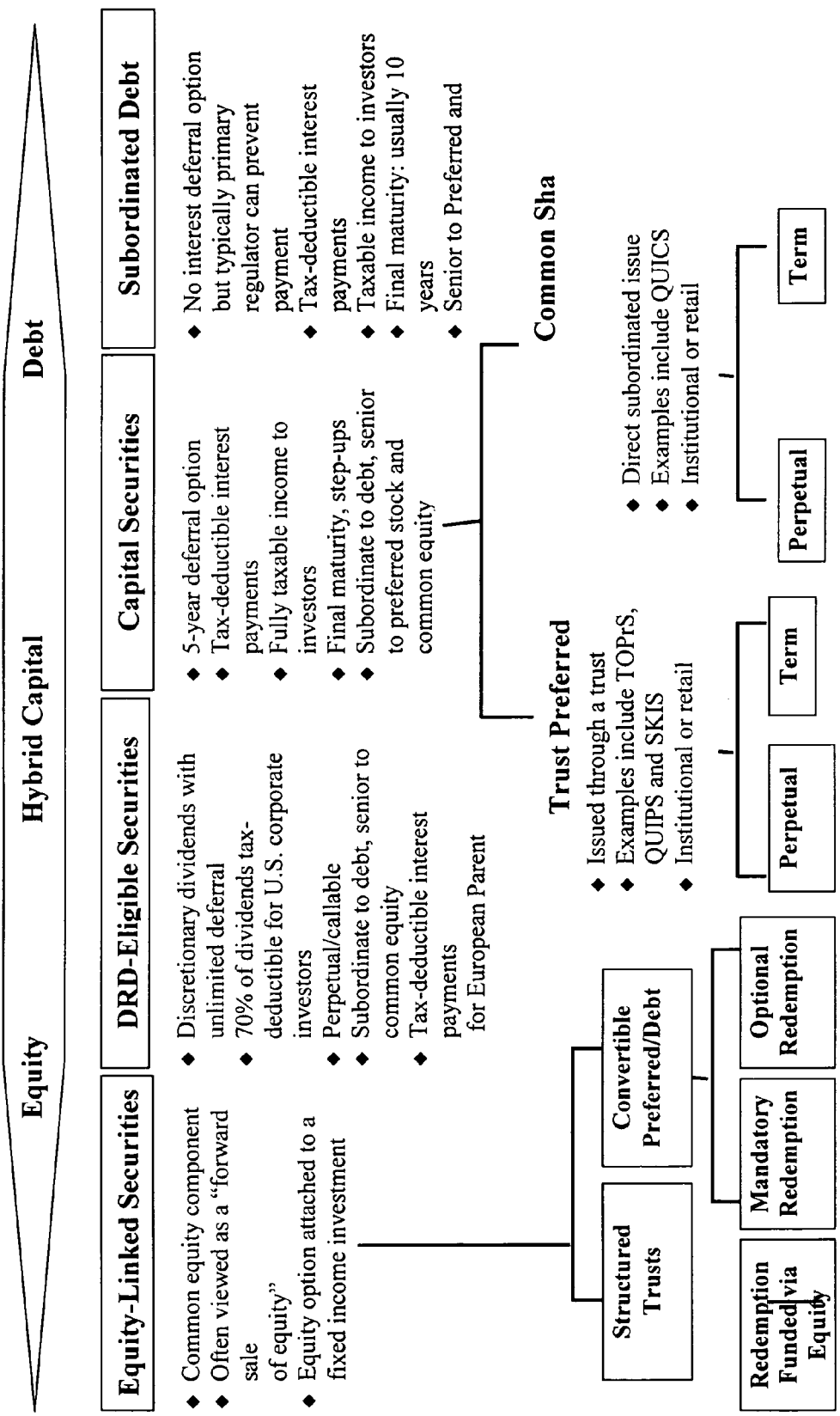
FIG. 5 depicts relationships among a number of hybrid capital securities.

Tier 1 capital is the core measure of a bank's financial strength from a regulator's point of view. It consists of the types of financial capital considered the most reliable and liquid, primarily Shareholders' equity. Examples of Tier 1 capital are common stock, preferred stock that is irredeemable and non-cumulative, and retained earnings. Tier 2 capital generally includes undisclosed reserves, revaluation reserves, general provisions, hybrid instruments and subordinated term debt. See FIG. 5.

Figure 6:
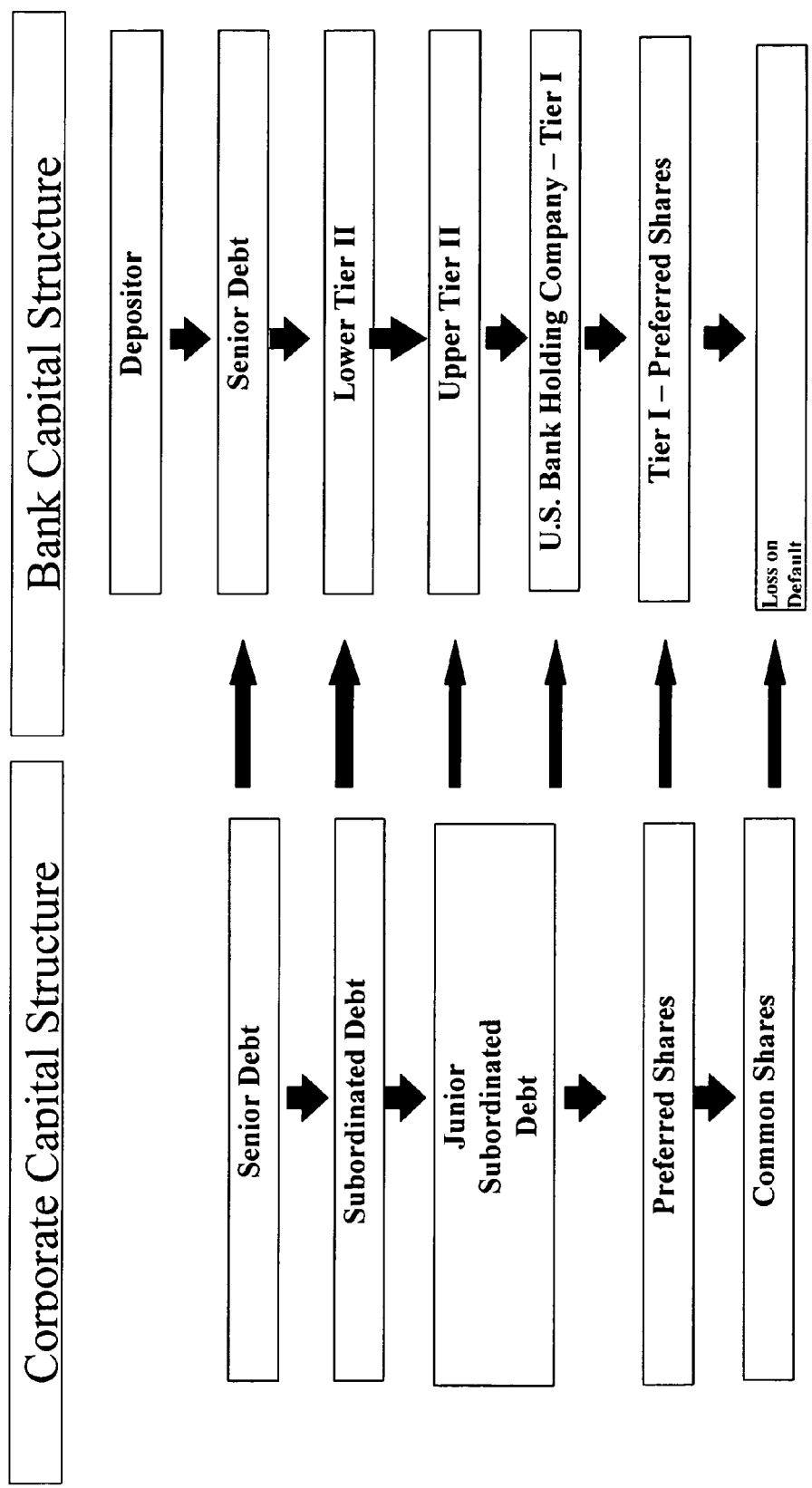
FIG. 6 shows typical capital structures.

Preferred CDS (PCDS) will, for the first time, enable investors to source, reference, and hedge Tier I and Junior Subordinated Preferred Securities. See FIG. 6. Deliverable securities may include all securities of the Reference Entity that are either pari-passu or senior in the Capital Structure to the Reference Obligation.

Future iterations may include Synthetic CDO origination.

Preferred CDS Applications

Hedging: Commercial banks hedge their bank loan portfolios blind to the borrower. Investment managers and insurance companies protect against spread widening while capitalizing on tax advantages of QDI (does not apply to non-retail accounts) and DRD-eligible securities. Investment Banks hedge cash trading inventory, including long secured loan positions, as well as counterparty exposure from derivative trading.

Customization: Hedge funds short credit without a short squeeze. Investment managers acquire credit exposure for terms unavailable in the cash market and execute index overlay strategies. Corporations take customized risk for cash and tax management.

Relative Value: Hedge funds use leverage, isolate the equity option in convertible bonds, and execute index outperformance strategies. Credit derivatives are one of the major tools that these funds use in capital structure arbitrage. Insurance Companies earn positive basis versus cash (on a pre- and after-tax basis).

EXAMPLES (1) A Higher Carry Long

If you are a bullish on a name, you can sell Preferred CDS instead of Senior CDS and earn more carry. Example: Switch out of RBS 5 yr Senior CDS@10 and sell RBS 5 yr Preferred CDS@30 and pick 20 bp.

(2) A More Volatile Short

If you are bearish on a credit, you can buy Preferred CDS instead of Senior CDS. A company is more likely to miss a preferred dividend than to default outright. As a result, PCDS should widen more than Senior CDS in a widening environment. Additionally, in the event of an outright default, Preferred CDS should have a lower recovery. Example: Buy XL 5 yr PCDS@60 instead of buying 1.6× XL Senior CDS for the same spread.

(3) Buy PCDS protection, Sell 2× Senior CDS protection

Example: Buy EOP 5 yr PCDS@40, Sell 2× EOP Senior CDS @80; flat carry. If EOP misses a preferred dividend payment, your PCDS protection will trigger while the senior protection you sold will not. In the event of a default, you make money if the PCDS recovers less than ½ of the Senior CDS.

(4) Sell PCDS protection, Buy Zero-Recovery protection

Example: Sell FNMA 5 yr PCDS@60, Buy FNMA Zero-Recovery CDS@38; 22 bp positive carry. The investor faces no recovery risk in the event of default, and makes money if PCDS recovery is greater than zero as he will receive par from the digital protection he bought. The main risk to this trade is if FNMA misses a payment on its preferred stock without filing for bankruptcy or restructuring.

(5) Buy Step-up Preferreds vs. PCDS

Example: Buy ZURNVX 4/25/2011 FRN@L+120 ($97.6), equates to L+325 with the DRD gross up. Buy 5 yr PCDS@90; 30 bp positive carry (235 DRD adjusted); slightly positive VOD. Depending on your status, you may still be eligible to receive DRD even with your hedge.

(6) Sell Preferred CDS and Buy Out-of-the-Money Equity Puts

Use your carry on the PCDS to fund the purchase of OTM puts. If the credit/equity performs well, you will earn money on the CDS while losing only your premium on the puts. If the credit/equity performs poorly, your puts will act as a hedge on your CDS position. Example: Sell $5 mm VNO 5 yr PCDS@105 and earn $30.6 k over 7 months. Buy 15,400 VNO Sep 05 65-strike Equity Puts@1.90 for $29 k (71.60 spot). If CDS tightens during the period, the investor makes money regardless of equity price. The best case scenario for the investor occurs if the equity price drops while PCDS remains unchanged or tightens.

Standard Documentation

Standard Credit Default Swap Terms

A Credit Default Swap is an over-the counter contract. There are, therefore, several important features that need to be clearly agreed upon and documented between the counterparties. These include:

Effective Date—Generally Trade Date plus one day.

Maturity Date—The most liquid part of the default curve is the 5 year point, though 3 year and 1 year also see some volume. The standard maturity date is the next of either March, June, September, or December 20th to occur after the desired trade length (i.e., the standard maturity date on a 5 year CDS effective Nov. 12, 2003 is Dec. 20, 2008).

Reference Entity—The relevant issuer in the credit protection exchange.

Notional Amount—The principal amount of default protection being exchanged.

Rate—Quoted as x basis points running.

Payment Dates—Generally the 20th of March, June, September, and December, with the first payment date being the first to occur after trade inception as long as said date is at least one month after the Trade Date. If not, the subsequent payment date becomes the first.

Reference Obligation—The purpose of the Reference Obligation is to specify which portion of the Obligor's capital structure represents the credit to which the trade is applicable and the Credit Event terms affect.

Credit Events—The circumstances of credit impairment that are being traded via the protection swap.

Settlement—How the protection buyer will be compensated in the case of a Credit Event triggering.

These standard terms are suggested and defined in market-stabilizing guidelines published by the International Swaps and Derivatives Association (ISDA), with the most recent version having been released in May 2003.

Summary of the (ISDA)—Defined Credit Events

The Default Swap contingent payment is triggered by some (or all) of the following Credit Events, depending upon the terms of the trade:

Bankruptcy—Corporate becomes insolvent or is unable to pay its debt (not relevant for sovereign issuers).

Failure to Pay—Failure of the reference entity to make due payments, taking into account some grace period to prevent accidental triggering due to administrative error.

Obligation Acceleration—Obligations become due and payable earlier than they would have been due to default or a similar condition.

Repudiation/Moratorium—A reference entity or government authority rejects or challenges the validity of the obligations (usually only for sovereign issuers).

Restructuring—Changes in debt obligations of the reference creditor but excluding those that are not associated with credit deterioration, such as renegotiation of more favorable terms.

The most typical types of CDS deals in the market today are traded under one of the following Credit Event assumptions:

"NoRe"—without restructuring as a credit event. NoRe trades usually include only Bankruptcy and Failure to Pay.

"OldRe"—with restructuring as a credit event and using the definition set forth in the 2003 ISDA Credit Derivative Definitions. OldRe trades typically include all of the credit events listed above, and spreads are quoted about 16% wider than NoRe spreads "ModRe"—with restructuring as a credit event and using the definition set forth in the 2003 ISDA Credit Derivative Definitions. ModRe trades typically include Bankruptcy, Failure to Pay, and Restructuring, and spreads are quoted about 6% wider than NoRe spreads.

The introduction of PCDS trading should increase the focus, demand, and subsequently, liquidity in this part of the capital structure. Ultimately, it will flatten the learning curve required to trade this sector by greatly simplifying hedging/risk management techniques. As a result, risk premiums should get squeezed. Also, many cash positions are hard to find and many cash structures are not accepted by some accounts. The 5 Yr term of the standard PCDS contract will further enable capital structure arbitrage and term structure arbitrage.

Also, PCDS creates transparency in the capital structure. PCDS lends the ability to short in the preferred space—it's difficult to short most preferred securities due to NYSE rules on locate to borrow. Moreover, PCDS presents the opportunity for curve trades.

Many of the factors that form "Subordination Premium" have also presented incredible opportunities for accounts that mastered the ability to hedge and leverage these risks.

Once PCDS are traded, it is possible to create an index. In one aspect, the present invention comprises a diverse basket of individual preferred credit default swaps used to create an innovative PCDS index (referred to herein as "PDX"). The single index holds each reference entity in equal weightings and preferably has semi-annual rolls. Having an index would add to the liquidity of the market, especially along that part of the capital structure, and serves as a very attracting hedging vehicle.

Preferably, PDX has the following features: (a) between 20 and 60 names across multiple sectors; (b) average rating of portfolio is Aa3/A—Preferred Rating; (c) standard maturity date with semi-annual rolls (September & March); (d) one fixed coupon for the life of the contract, trades with an upfront payment in the secondary market, just as other CDS index products; and (e) unlike other CDS index products which trade without Restructuring, PDX will trade with Modified Restructuring (ModRe) for North American names and Modified Modified Restructuring for European names.

In the event of trigger event affecting one of the underlying names, the portfolio will continue to trade in the market, while the defaulted (or triggered) credit will be removed from the portfolio.

Benefits of PDX comprise the following: (a) PDX will transcend single name PCDS to further expand the focus and liquidity in the subordinated levels of the capital structure; (b) portfolio products create efficiencies in the market, allowing for simultaneous execution and hedging on a basket rather than the just a single credit; (c) PDX may be a more attractive (i.e., liquid) means to express a negative view on subordination or a more appropriate hedge vehicle; (d) conversely, PDX may be a more attractive means to express a positive view on a credit; (e) PDX allows for an arbitrage opportunity by trading the premium/discount value of the portfolio vs. its intrinsic value; (f) the portfolio should increase the flow and transparency throughout the single name PCDS market; and (g) a PCDS portfolio lends to a natural basis between PDX and CDX products, a step beyond Senior vs. PCDS single-name trades.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

In general, although particular embodiments of the invention have been described in detail for the purpose of illustration, it is to be understood that such detail is solely for that purpose and that variations can be made thereof by those skilled in the art without departing from the scope of the invention, which should be determined exclusively from the plain wording of the appended claims. Any details in the specification that are not included in the claims themselves should not be construed as limiting the scope of the invention.

APPENDIX – EXEMPLARY AGREEMENT

Transaction

Date: 11 September, 2006

To: [Counterparty]
    Attention: Documentation Unit

From: XYZ Financing Inc.
    New York, NY
    Transaction Management Group
    Facsimile: (United States of America)
    Telephone: {contact details of confirmer}

Ref. Numbers: Risk ID: / Effort ID: / Global Deal ID:

Dear Sir or Madam:

The purpose of this communication (this "Confirmation") is to confirm the terms and conditions of the transaction (the "Transaction") entered into between Lehman Brothers Special Financing Inc. ("Party A") and [Counterparty] ("Party B") on the Trade Date specified below. This Confirmation constitutes a "Confirmation" as referred to in the Agreement specified below.

This Confirmation supplements, forms part of, and is subject to, the ISDA Master Agreement dated as of [Agreement Date], as amended and supplemented from time to time, between Party A and Party B (the "Agreement"). All provisions contained in the Agreement shall govern this Confirmation except as expressly modified below.

[This Confirmation evidences a complete and binding agreement between Party A and Party B as to the terms of the Transaction to which this Confirmation relates. In addition, you and we agree to use all reasonable efforts promptly to negotiate, execute and deliver an agreement in the form of the ISDA Master Agreement (Multicurrency-Cross Border) (the "ISDA Form"), with such modifications as you and we will in good faith agree. Upon the execution by you and us of such an agreement, this Confirmation shall supplement, form a part of, and be subject to that agreement (the "Agreement"). All provisions contained or incorporated by reference in the Agreement, upon its execution, will govern this Confirmation except as expressly modified below. Until we execute and deliver the Agreement, this Confirmation, together with all other documents confirming transactions entered into between us and referring to the ISDA Form, shall supplement, form a part of, and be subject to an agreement in the form of the ISDA Form as if we had executed an agreement in such form (but without any Schedule) on the Trade Date of this Transaction. In the event of any inconsistency between the provisions of that agreement, or the Agreement, when executed, and this Confirmation, this Confirmation will prevail for the purpose of this Transaction.][1]

The definitions and provisions contained in the 2003 ISDA Credit Derivatives Definitions as supplemented by the May 2003 Supplement to the 2003 ISDA Credit Derivatives Definitions (the "Credit Derivatives Definitions") as published by the International Swaps and Derivatives Association, Inc., are incorporated into this Confirmation. In the event of any inconsistency between the Credit Derivatives Definitions and this Confirmation, this Confirmation shall govern.

---

[1] Use this paragraph if we do not have an executed Master Agreement

Party A and Party B each represents that entering into the Transaction is within its capacity, is duly authorized and does not violate any laws of its jurisdiction of organization or residence or the terms of any agreement to which it is a party. Party A and Party B each represents that (a) it is not relying on the other party in connection with its decision to enter into this Transaction, and neither party is acting as an advisor to or fiduciary of the other party in connection with this Transaction regardless of whether the other party provides it with market information or its views; (b) it understands the risks of the Transaction and any legal, regulatory, tax, accounting and economic consequences resulting therefrom; and (c) it has determined based upon its own judgment and upon any advice received from its own professional advisors as it has deemed necessary to consult that entering into the Transaction is appropriate for such party in light of its financial capabilities and objectives. Party A and Party B each represents that upon due execution and delivery of this Confirmation, it will constitute a legally valid and binding obligation, enforceable against it in accordance with its terms, subject to applicable principles of bankruptcy and creditors' rights generally and to equitable principles of general application.

The terms of the particular Transaction to which this Confirmation relates are as follows:

1. General Terms:

| | |
|---|---|
| Transaction: | Credit Derivative Transaction |
| Trade Date: | [ ] |
| Effective Date: | [ ] |
| Scheduled Termination Date: | [ ] |
| Floating Rate Payer: | [[Party A][Party B]] (the "*Seller*") |
| Fixed Rate Payer: | [[Party A][Party B]] (the "*Buyer*") |
| Calculation Agent: | [[The Seller][Party A]] |
| Calculation Agent City: | [city] |
| Business Day: | [[New York][London][Target]] |
| Business Day Convention: | Following (which, subject to Sections 1.4 and 1.6 of the Credit Derivatives Definitions, shall apply to any date referred to in this Confirmation that falls on a day that is not a Business Day). |
| Reference Entity: | [ ] |
| Reference Obligation(s): | The obligation(s) identified as follows: |
| | [Primary Obligor][Related Trust Preferred Issuer]: [ ] |
| | Dividend Rate: [ ] |
| | Title: [ ] |
| | CUSIP / ISIN: [ ] |
| All Guarantees: | [Applicable] [Inapplicable][2] |
| Reference Price: | 100.00% |

---

[2] Applicable for European Reference Entities, Not Applicable for North American Entities

2. Fixed Payments:

| | |
|---|---|
| Fixed Rate Payer Calculation Amount: | [ccy][amount] |
| Fixed Rate: | [ ]% per annum |
| Fixed Rate Day Count Fraction: | Actual/360 |
| Fixed Rate Payer Payment Dates: | [ ], and thereafter the 20th of each March, June, September, and December |

3. Floating Payments:

Floating Rate Payer Calculation Amount: [ccy][amount]

Conditions to Settlement: Credit Event Notice

Notifying Party: Buyer or Seller

Notice of Publicly Available Information Applicable

Notice of Physical Settlement

Credit Event(s): The following Credit Event(s) shall apply to this Transaction:

Bankruptcy
Failure to Pay
    Grace Period Extension: Inapplicable

Payment Requirement: USD1,000,000.00, or its equivalent in the relevant Obligation Currency as of the occurrence of the relevant Failure to Pay Deferral of Payment Restructuring[3]

[Restructuring Maturity Limitation and Fully Transferable Obligation: Applicable][4]

[Modified Restructuring Maturity Limitation and Conditionally Transferable Obligation: Applicable][5]

Default Requirement: USD10,000,000.00, or its equivalent in the relevant Obligation Currency as of the occurrence of the relevant Credit Event.

---

[3] Delete Restructuring Maturity Limitation and Default Requirement if Restructuring is Not Applicable
[4] For use with North American Reference Entities
[5] For use with European Reference Entities Obligation(s):
    Obligation Category: Borrowed Money and Preferred Security
    Obligation Characteristics: None

4. Settlement Terms:

Settlement Method: Physical Settlement

Terms Relating to Physical Settlement:

Physical Settlement Period: [In accordance with Section 8.6 of the Credit Derivative Definitions; provided, however, that the Physical Settlement Period shall be subject to a maximum of 30 Business Days.][6] [30 Business Days][7]

Deliverable Obligations: Exclude Accrued Interest

Deliverable Obligation(s):

Deliverable Obligation Category: Bond or Loan or Preferred Security

Deliverable Obligation Characteristic(s): Deliverable Obligation Characteristic(s) shall mean each of the following:
Not Subordinated
Specified Currency: Standard Specified Currencies
Not Contingent
Assignable Loan
Consent Required Loan
Transferable
Maximum Maturity 30 years
Not Bearer

[Additional Terms:

Notwithstanding Section 1.7 or any provisions of Sections 9.9 or 9.10 to the contrary, but without prejudice to Section 9.3 and (where applicable) Sections 9.4, 9.5 and 9.6 if the Termination Date has not occurred on or prior to the date that is 60 Business Days following the Physical Settlement Date, such 60th Business Day shall be deemed to be the Termination Date with respect to this Transaction except in relation to any portion of the Transaction (an "Affected Portion") in respect of which:

(1) a valid notice of Buy-in Price has been delivered that is effective fewer than three Business Days prior to such 60th Business Day, in which case the Termination Date for that Affected Portion shall be the third Business Day following the date on which such notice is effective; or (2) Buyer has purchased but not Delivered Deliverable Obligations validly specified by Seller pursuant to Section 9.10(b), in which case the Termination Date for that Affected Portion shall be the tenth Business Day following the date on which Seller validly specified such Deliverable Obligations to Buyer.][8]

---

[6] For use with North American Reference Entities
[7] For use with European Reference Entities
[8] For use with European Reference Entities

| | |
|---|---|
| Partial Cash Settlement of Consent Required Loans: | Inapplicable |
| Partial Cash Settlement of Assignable Loans: | Inapplicable |
| Escrow: | Applicable |

5. Notice and Account Details:

Telephone, Telex and/or Facsimile Numbers and Contact Details for Notices:

| | |
|---|---|
| Party A: | [Party A]<br>Attn:<br>Telephone: |
| Cc: | Facsimile: |
| Party B: | Please advise |

Account Details:

| | |
|---|---|
| Account Details of Party A: | Bank<br>ABA No<br>Account Number:<br>Account of: |
| Account Details of Party B: | Please advise |

6. Offices:

| | |
|---|---|
| Party A: | Party A is not a Multibranch Party. |
| Party B: | [ ] |

7. Other:

The Credit Derivatives Definitions shall be amended as follows:

(a) Section 2.1 ("Reference Entity") is hereby amended by adding the words "except as otherwise set forth herein" at the end of the first sentence.

(b) Section 2.3 ("Reference Obligation") is hereby amended by adding the following sentence at the end thereof: "A Reference Obligation may be an obligation of either the Reference Entity directly or of a Related Trust Preferred Issuer."

(c) Section 2.14 ("Obligation") is hereby amended by adding the following sentence at the end thereof: "For purposes hereof, references in the preceding sentence to "Reference Entity" shall include references to any other entity determined pursuant to Section 4.11(a)."

(d) Section 2.15 ("Deliverable Obligation") is hereby amended by adding the words "2.21(f)," after the words "subject to Sections" on the first line thereof.

(e) (i) In Section 2.19 ("Method for Determining Obligations"), Section 2.19(a) is hereby amended by adding the following at the end thereof as subsection (vii):

(vii) "Preferred Security" means any obligation that represents a class of equity ownership which upon liquidation ranks prior to the claims of common stock holders and which, for the avoidance of doubt, shall not be included in the Borrowed Money Obligation Category. Preferred Securities shall include any Preferred Security issued by a Related Trust Preferred Issuer.

(ii) Section 2.19(a) is hereby amended by, deleting the word "or" which appears immediately prior to the words "Bond or Loan" in the second line thereof, adding the words "or Preferred Security" after the words "Bond or Loan" on the second line thereof and deleting the words "only one" in the second line thereof and replacing such words with "one or more".

(iii) Section 2.19(b)(i)(A) is hereby amended by deleting the first sentence in its entirety and replacing it with the following: "(A) "Not Subordinated" means (i)

(I) if an obligation is not a Preferred Security issued by a Related Trust Preferred Issuer (for purposes of this Section 2.19(b), a "Trust Preferred Security") and the Reference Obligation(s) do not include Trust Preferred Securities, such obligation is not Subordinated to the most senior Reference Obligation in priority of payment;

(II) if an obligation is a Trust Preferred Security and the Reference Obligation(s) do not include Trust Preferred Securities, the obligations held by such Related Trust Preferred Issuer are not Subordinated to the most senior Reference Obligation in priority of payment;

(III) if an obligation is not a Trust Preferred Security and the Reference Obligation is a Trust Preferred Security, such obligation is not Subordinated to the obligations held by the Related Trust Preferred Issuer which is the obligor with respect to the Reference Obligation in priority of payment; and (IV) if an obligation is a Trust Preferred Security and the Reference Obligation is a Trust Preferred Security, the obligations held by such Related Trust Preferred Issuer which is not the obligor with respect to the Reference Obligation are not Subordinated to the obligations held by the Related Trust Preferred Issuer which is the obligor with respect to the Reference Obligation in priority of payment; or (ii) if no Reference Obligation is specified in the related Confirmation, any unsubordinated Borrowed Money obligation of the Reference Entity."

(f) In Section 2.20 ("Method for Determining Deliverable Obligations"), Section 2.20(a) is hereby amended by deleting the word "or" which appears immediately prior to the words "Bond or Loan" on the second line thereof and adding the phrase "or Bond or Loan or Preferred Security" after the words "Bond or Loan" on the second line thereof. Notwithstanding the parenthetical in Section 2.20(a), "Bond or Loan or Preferred Security" shall mean any obligation that is either a Bond or a Loan or a Preferred Security.

(g) In Section 2.21 ("Interpretation of Provisions"), Section 2.21(b) is hereby amended by (i) replacing the references to "Bonds" in subsection (i) thereof with "Bonds or Preferred Securities" and (ii) adding the following at the end thereof: "; or (iv) either of the Deliverable Obligation Characteristics "Not Contingent" or "Maximum Maturity" is specified in a Confirmation, the Confirmation shall be construed as though each of such Deliverable Obligation Characteristics had been specified as a Deliverable Obligation Characteristic only with respect to Deliverable Obligations which are not Preferred Securities (and shall only be relevant to the extent that obligations other than Preferred Securities are covered by the selected Deliverable Obligation Category)"; *provided, however*, (x) if an obligation is a Preferred Security and such obligation is convertible, then such obligation must be a Convertible Obligation to be a Deliverable Obligation, (y) if an obligation is a Preferred Security and such obligation is exchangeable, then such obligation must be an Exchangeable Obligation to be a Deliverable Obligation and (z) if an obligation is a Preferred Security and is a Convertible Obligation or Exchangeable Obligation, then such obligation may be a Deliverable Obligation only if the right (A) to convert or exchange such obligation or (B) to require the issuer to purchase or redeem such obligation (if the issuer has exercised the right to pay the purchase or redemption price, in whole or in part, in Equity Securities) has not been exercised (or such exercise has been effectively rescinded) on or before the Delivery Date.

(h) Section 2.21(c) is hereby amended by adding the phrase "Bond or Loan or Preferred Security, " after the words "Borrowed Money, " on the first line thereof.

(i) A new section 2.21(e) is hereby added as follows: "The terms "interest", "interest amount" and "interest rate" when used in connection with Preferred Securities are to be interpreted to be references to the scheduled or stated dividend rate, distribution rate or other periodic rate applicable to such Preferred Securities."

(j) A new section 2.21(f) is hereby added as follows: "For purposes of determining whether an obligation satisfies (x) the Deliverable Obligation Category and the Deliverable Obligation Characteristics and (y) the Obligation Categories and Obligation Characteristics, references to "Reference Entity" shall be deemed to mean, in respect of Bonds and Loans, the Reference Entity only and, in respect of Borrowed Money and Preferred Securities, either the Reference Entity or a Related Trust Preferred Issuer (the "Deemed Reference Entity"), as applicable. For the avoidance of doubt, to constitute a Deliverable Obligation, an obligation must satisfy the Deliverable Obligation Category and the Deliverable Obligation Characteristics in relation to the same Deemed Reference Entity. For all purposes hereunder, references to "Reference Entity" in relation to a Deliverable Obligation or an Obligation shall mean the applicable Deemed Reference Entity. "

(k) In Section 2.30 ("Substitute Reference Obligation"), Section 2.30(a) is hereby amended by adding the words "or of a Related Trust Preferred Issuer, as applicable" after the words "of a Reference Entity" in clause (C) thereof. Section 2.30(b) is hereby amended by adding the words "or, if the Reference Obligation to be substituted was an obligation of a Related Trust Preferred Issuer, a Related Trust Preferred Issuer" at the end of the first sentence thereof.

(l) In Section 2.32 ("Restructuring Maturity Limitation and Fully Transferable Obligation") and Section 2.33 ("Modified Restructuring Maturity Limitation and Conditionally Transferable Obligation"), respectively, Section 2.32(b) and 2.33(b) are each hereby amended by replacing references to "Bonds" with "Bonds or Preferred Securities".

(m) Section 2.32(e) and 2.33(e) are each hereby deleted in its entirety and replaced with the following: "Restructured Bond or Loan or Preferred Security" means an Obligation which is a Bond or Loan or Preferred Security and in respect of which a Restructuring that is the subject of a Credit Event Notice has occurred." All references to "Restructured Bond or Loan" in the Credit Derivatives Definitions shall be replaced with "Restructured Bond or Loan or Preferred Security."

(n) Section 4.1 ("Credit Event") is hereby amended by (i) adding the words ", Deferral of Payment" after the words "Repudiation/Moratorium" on the third line thereof and (ii) adding the following sentence at the end thereof: "For the purpose of determining whether a Credit Event has occurred, each of the Obligation Categories shall independently be applicable, so that a Credit Event may occur as measured by either Obligation Category and need not have occurred with respect to both Obligation Categories."

(o) A new Section 4.10 is hereby added entitled "Deferral of Payment":

"Deferral of Payment" means, after the expiration of any applicable Grace Period (after the satisfaction of any conditions precedent to the commencement of such Grace Period) , with respect to one or more Obligations which are Preferred Securities and a scheduled payment date thereon, the Reference Entity does not, pursuant to the terms of such Preferred Security and in an aggregate amount of not less than the Payment Requirement, pay a dividend or other distribution in the full amount of the stated dividend rate or distribution rate or other periodic rate, or otherwise defers all or a portion of the scheduled dividend or other distribution in an aggregate amount of not less than the Payment Requirement. For the avoidance of doubt, a Deferral of Payment (i) may occur even if the terms of the Preferred Security allow for voluntary deferrals of payments or do not otherwise require the payment of a dividend or distribution and (ii) shall not apply to any Obligation which is not a Preferred Security.

(p) A new Section 4.11 is hereby added entitled "Interpretation of Provisions":

(A) For purposes of determining whether a "Bankruptcy", "Failure to Pay", "Restructuring" or "Deferral of Payment" has occurred, references in the definition thereof to "Reference Entity" shall be construed to mean any of the Reference Entity or a Related Trust Preferred Issuer.

(B) "Related Trust Preferred Issuer" means any trust which issues Preferred Securities (i) the sole assets of which are obligations of a Reference Entity (either directly or as provider of a Qualifying Affiliate Guarantee or, if All Guarantees is selected as applicable in the related confirmation, as provider of any Qualifying Guarantee) and (ii) the common securities of which are held directly or indirectly by the Reference Entity, or an affiliate thereof.

(q) Section 8.8 ("Due and Payable Amount") is hereby amended by adding the following sentences at the end thereof: "Solely for purposes of a Preferred Security, the "Due and Payable Amount" of a Preferred Security shall be the aggregate par or stated value or redemption amount or liquidation amount (or other similar concept however expressed) (the "Liquidation Preference") of such Preferred Security according to its terms, without regard to whether such amount is payable at such time or is capable of being paid in full at such time (whether by way of redemption or upon dissolution, liquidation or winding up or otherwise). In determining the Due and Payable Amount of a Preferred Security, the relevant number of shares or securities shall be multiplied by the applicable Liquidation Preference. In case the Liquidation Preference can not readily be ascertained, the Liquidation Preference shall be determined with regard to the initial offering price (without giving effect to any underwriting discount)."

(r) All references to "Bonds" in Section 9.2(c) and to "Bonds" (including "Relevant Bonds") in Section 9.9 shall be deemed to apply equally to Preferred Securities, provided that references in Section 9.9 to "outstanding principal balance" shall, in the case of Preferred Securities, be to "Due and Payable Amount".

Please confirm your agreement with the foregoing by executing this Confirmation and returning such Confirmation, in its entirety, to us at facsimile number 646-885-9554 (United States of America), Attention: Documentation.

Yours sincerely,    Accepted and agreed to:

XYZ Financing Inc.    [Counterparty]

By: _____
Name:
Title:

We claim:

1. A non-transitory computer readable storage medium having computer-executable instructions recorded thereon that, when executed on a computer, configure the computer to perform a method comprising:
   specifying a reference entity which is an obligor with respect to preferred securities;
   defining a credit event to include deferral of dividend or coupon on said preferred securities;
   specifying a payoff to include a value of said preferred securities, said payoff to be made following said credit event;
   specifying a premium; and
   accessing and processing data regarding an agreement executed with a protection buyer, wherein said agreement comprises terms based on said reference entity, said credit event, and said payoff, and wherein said protection buyer agrees to pay said premium in return for a promise to be provided said payoff upon occurrence of said credit event.

2. A computer readable storage medium as in claim 1, wherein said payoff is provided to said protection buyer upon occurrence of a deferral of a dividend or a coupon.

3. A computer readable storage medium as in claim 1, wherein said preferred securities are perpetual preferred or hybrid securities.

4. A computer readable storage medium as in claim 1, wherein said preferred securities are trust preferred securities.

5. A non-transitory computer readable storage medium having computer-executable instructions recorded thereon that, when executed on a computer, configure the computer to perform a method comprising:
   accessing and processing data regarding an agreement executed with a protection provider, wherein said agreement comprises definitions for a reference entity, a credit event, and a payoff, and wherein said protection provider promises to provide said payoff upon occurrence of said credit event in exchange for payment of a premium;
   wherein said reference entity is an obligor with respect to preferred securities,
   wherein said credit event is defined to include deferral of dividend or coupon on said preferred securities, and
   wherein said payoff to be made following said credit event includes a value of said preferred securities.

6. A computer readable storage medium as in claim 5, wherein said payoff is received from said protection provider upon occurrence of a deferral of a dividend or coupon.

7. A computer readable storage medium as in claim 5, wherein said preferred securities are perpetual preferred or hybrid securities.

8. A computer readable storage medium as in claim 5, wherein said preferred securities are trust preferred securities.

9. A non-transitory computer readable storage medium having computer-executable instructions recorded thereon that, when executed on a computer, configure the computer to perform a method comprising:
   accessing and processing data regarding an agreement executed with a protection buyer, wherein said agreement comprises definitions for a reference entity, a credit event, and a payoff, and wherein said protection buyer agrees to pay a premium in exchange for a promise to be provided said payoff upon occurrence of said credit event;
   wherein said reference entity is an obligor with respect to preferred securities,
   wherein said credit event is defined to include deferral of dividend or coupon on said preferred securities, and
   wherein said payoff to be made following said credit event includes a value of said preferred securities.

10. A computer readable storage medium as in claim 9, wherein said payoff is provided to said protection buyer upon occurrence of a deferral of a dividend or a coupon.

11. A computer readable storage medium as in claim 9, wherein said preferred securities are perpetual preferred or hybrid securities.

12. A computer readable storage medium as in claim 9, wherein said preferred securities are trust preferred securities.

13. A computer system comprising:
   memory configured to store at least one program; and
   at least one processor communicatively coupled to the memory, in which the at least one program, when executed by the at least one processor, causes the at least one processor to:
   access and process data regarding:
      a reference entity comprising an obligor with respect to preferred securities,
      a credit event involving a deferral of dividend or coupon on said preferred securities, and
      an agreement involving a protection buyer and a protection provider, wherein said agreement comprises terms concerning said reference entity, said credit event, and a payoff, and wherein said protection buyer agrees to pay a premium and said protection provider agrees to provide said payoff to said protection buyer upon occurrence of said credit event;
   calculate said payoff to include a value of said preferred securities, said payoff to be made following said credit event; and
   calculate said premium.

14. A computer system as in claim 13, wherein said payoff occurs upon deferral of a dividend or a coupon.

15. A computer system as in claim 13, wherein said preferred securities are perpetual preferred or hybrid securities.

16. A computer system as in claim 13, wherein said preferred securities are trust preferred securities.

17. A non-transitory computer readable storage medium having computer-executable instructions recorded thereon that, when executed on a computer, configure the computer to perform a method comprising:
   specifying a reference entity which is an obligor with respect to preferred securities;
   defining a credit event to include deferral of dividend or coupon on said preferred securities;
   specifying a payoff to include a value of said preferred securities, said payoff to be made following said credit event;
   specifying a premium;
   accessing and processing data regarding an agreement executed with a protection provider, wherein said agreement comprises terms based on said reference entity, said credit event, and said payoff, and wherein said protection provider promises to provide said payoff to said protection buyer upon occurrence of said credit event in exchange for payment of a premium.

18. A computer readable storage medium as in claim 17, wherein said payoff is received from said protection provider upon occurrence of a deferral of a dividend or coupon.

19. A computer readable storage medium as in claim 17, wherein said preferred securities are perpetual preferred or hybrid securities.

20. A computer readable storage medium as in claim 17, wherein said preferred securities are trust preferred securities.

* * * * *

UNITED STATES PATENT AND TRADEMARK OFFICE
CERTIFICATE OF CORRECTION

| | | |
|---|---|---|
| PATENT NO. | : 8,510,203 B2 | Page 1 of 1 |
| APPLICATION NO. | : 11/519577 | |
| DATED | : August 13, 2013 | |
| INVENTOR(S) | : Corcoran et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 158 days.

Signed and Sealed this
Tenth Day of March, 2015

Michelle K. Lee
*Deputy Director of the United States Patent and Trademark Office*